Aug. 20, 1929.  E. A. SPERRY, JR  1,725,600
AUTOMATIC PILOT
Filed April 26, 1927    2 Sheets-Sheet 1

INVENTOR
ELMER A. SPERRY. JR.
BY
Herbert H. Thompson
ATTORNEY

Aug. 20, 1929.   E. A. SPERRY, JR   1,725,600
AUTOMATIC PILOT
Filed April 26, 1927   2 Sheets-Sheet 2
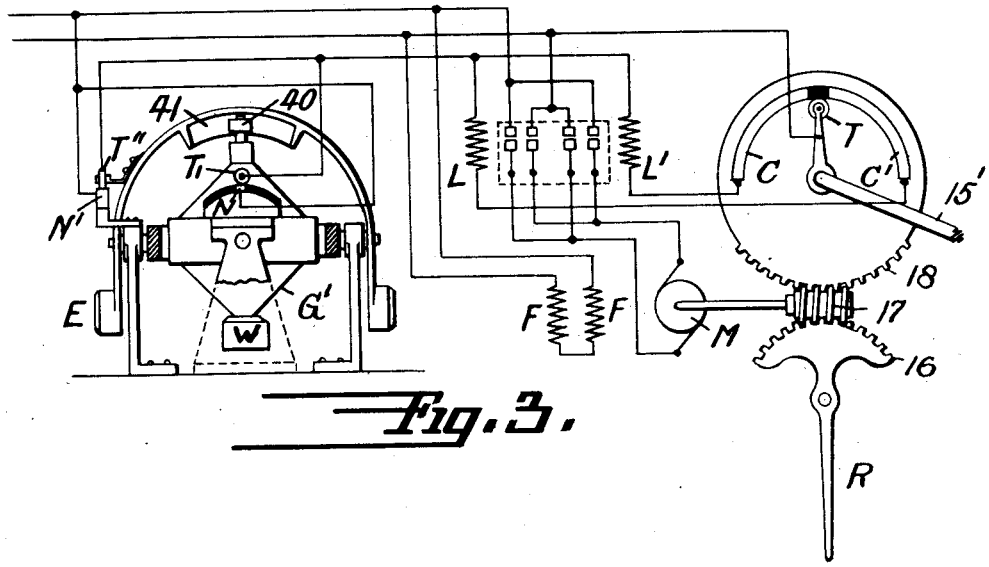
INVENTOR
ELMER A. SPERRY, JR.
BY
Herbert H. Thompson
ATTORNEY.

Patented Aug. 20, 1929.

1,725,600

UNITED STATES PATENT OFFICE.

ELMER A. SPERRY, JR., OF BROOKLYN, NEW YORK, ASSIGNOR, BY MESNE ASSIGNMENTS, TO SPERRY GYROSCOPE COMPANY, INC., A CORPORATION OF NEW YORK.

AUTOMATIC PILOT.

Application filed April 26, 1927. Serial No. 186,646.

This invention relates to the automatic steering of dirigible craft and has for its principal object to prevent needless operation of the steering engines and unnecessary actuation of the rudder during excessive yaw of the ship. Such yaw is usually due to weather conditions which set up a quartering sea to cause the vessel to partake of the familiar cork-screw movement of combined rolling, pitching and yawing. Such yaw, usually known as weather yaw, is characterized by large amplitude, short-period oscillations. Thus, for example, while the normal yaw of the vessel may be from 30 to 100 seconds for a complete oscillation, weather yaw will have a period of 5 to 15 seconds, and while the normal degree of yaw is approximately 2° or less the weather yaw may be 60° or more. It will be apparent from these statements that if the rudder were to be operated to follow these rapid large amplitude oscillations, the steering engines would be overworked needlessly because the vessel returns itself to course. It is the principal object of this invention, therefore, to determine when the yaw exceeds the normal yaw and under such circumstances either to cut out the operation of the rudder entirely or to slow down its actuation so that it will be only slightly actuated for large degree of yaw.

Other objects and advantages of my invention will become apparent in the following detailed description thereof.

In the accompanying drawings—

Fig. 3 is a diagrammatic view of a third embodiment of my invention.

Figure 1:
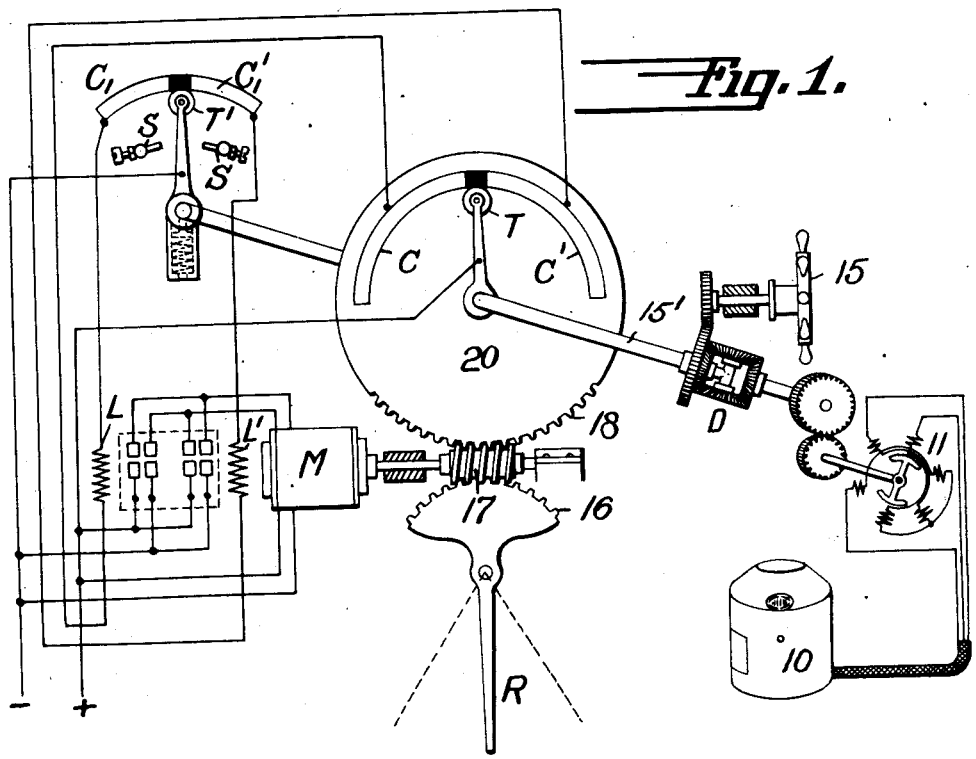
Fig. 1 represents an assembly view, large diagrammatic, embodying one form of my invention in an automatic steering device.

Referring to the drawings, there is disclosed in Fig. 1 an automatic steering device adapted to be controlled from a master gyroscopic compass 10 which actuates a repeater motor 11. Said repeater motor controls one side of a differential D, the other side of which is controlled by a hand wheel 15 to permit hand control of the rudder through the steering engines. Both the repeater 11 and the handwheel 15 act through the differential D to control a trolley T operating in conjunction with contact segments C—C' to control the circuit through a reversible motor M to drive the rudder R in one direction or the other to bring the vessel back to its course or to bring the vessel into a new course. A follow-up connection is shown diagrammatically in the form of gearing 16—17—18 from the rudder to the ring 20 bearing the contact segments C—C', so that the said segments follow the movements of the trolley.

With the above construction it would be apparent that any deviation of the ship, including those due to weather yaw, would immediately cause actuation of rudder R and in the case of weather yaw, where the amplitude of yaw is so great, would cause rapid actuation of the rudder from hardover position to hard-over position at a rate that would soon wear out the steering engines. It will be understood that a rudder is actuated some 3 or 4 degrees per degree of yaw so that it will readily be appreciated that the rudder will be operated from one extreme to the other violently and frequently during weather yaw. It will also be understood that while for diagrammatic purposes I have shown the motor M mechanically geared to rudder R, it will be understood that actually said motor may control hydraulic steering engines or other steering gear which is very liable to damage when overworked.

To obviate the condition hereinbefore set forth, which would cause overworking of the steering engines and needless actuation of the rudder, I provide means for cutting out or slowing down the actuation of the rudder when the yaw exceeds normal yaw. For this purpose it is necessary to provide means which will in some way detect or respond to yaw in excess of normal yaw. In Fig. 1 I have shown mounted upon the same shaft 15', which carries trolley T, a second trolley T' in engagement with contact segments $C_1$ and $C'_1$, so that whenever trolley T engages contacts C—C' trolley T' will engage contact $C_1$ or $C'_1$, respectively. I may mount the trolley T' upon shaft 15 with a slip friction connection and cause the movement of trolley T' to be limited to a very small degree beyond the insulating segment, so that while trolley T is free to move the full angular distance on contacts C—C' corresponding to the yaw, trolley T' may move only a very short distance just into engagement with contact $C_1$ or $C'_1$ and is held there by means such as adjustable stops S while slipping occurs between the trolley T' and the shaft 15. I cause the circuit through motor M to include both trolleys T and T' and contacts C—C' and C₁—C'₁, as shown to energize one or the other of relays L—L' to control the direction of motor M. It will be apparent that as soon as the vessel starts back to its course, trolley T' will immediately leave its contact and even engage the opposite contact thus breaking circuit through the motor to prevent further actuation of the steering engines and rudder R. No further actuation of rudder R will occur until trolley T has engaged the opposite contact segment whereupon the motor will be actuated until the vessel starts back to its course and trolley T' leaves its contact segment.

From the above described structure it will be apparent that the operation of the rudder in weather yaw is thus cut down to a very small fraction of what it would otherwise be without the provision of the circuit breaking means in the form of trolley T' and contacts C₁ and C'₁. Without the additional control it is apparent that the rudder R would be actuated throughout the entire time that trolley T engaged contact C or C', which would mean for the entire period that it took the steering engine to move the rudder through an angle sufficient to turn the follow-up sector through the angle that trolley T had turned through. It will be apparent that at least 50% of this degree of actuation of the rudder is eliminated.

Figure 2:
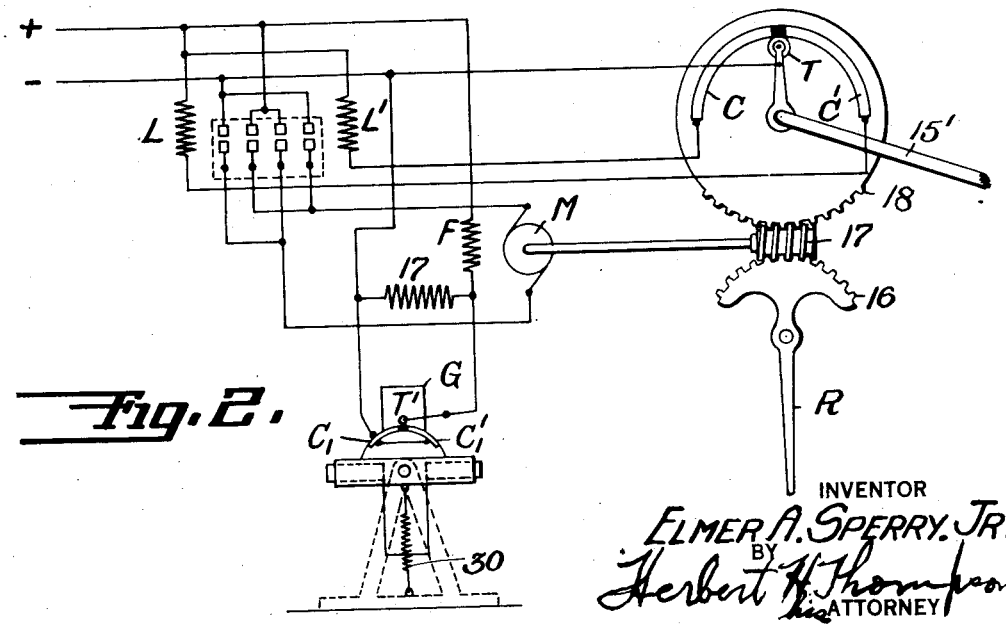
Fig. 2 is a diagrammatic representation of a second embodiment of my invention.

In Fig. 2 I have embodied the principles of my invention in a somewhat different form. In this case I cause the circuit through motor M to be controlled not only by trolley T and contacts C—C', but also by a turn indicator gyro comprising a gyro rotor G mounted with two degrees of freedom and with its spinning axis athwartship, so that yaw of the vessel will cause precession of the gyro toward a horizontal plane. I cause the gyro frame to carry the additional contacts C₁— C'₁ with which engages a contact or trolley T' normally in engagement with an insulated segment. I cause the precession of the gyro to be constrained or limited by some means, such as spring 30. After the gyro has precessed a predetermined degree corresponding to normal yaw, the trolley T' will leave the insulated segment and engage one or the other of contacts C₁ or C'₁. This will short-circuit a resistance 17 normally in series with shunt field F of motor M to permit the full supply voltage to be impressed on the field F and thus slow down the motor. It will, of course, be apparent that instead of merely slowing down the motor, I may break the circuit entirely when trolley T' engages contact C₁ or C'₁, as in the Fig. 1 form of the invention, to stop the actuation of the rudder rather than merely slow it down.

In Fig. 3 I have shown still another form of my invention wherein I employ a vertical gyro G' pendulously mounted as by means of weight W or in any other well known manner so that said gyro will maintain the vertical. The gyro is mounted with three degrees of freedom. The device is designed to respond to either excessive rolling or excessive pitching or both, which usually accompany excessive yawing. Assuming that the athwartship axis of the ship lies in the plane of the paper, I provide a trolley T₁ adapted to move with the vessel about a fore and aft axis, that is, during the rolling movement. The said trolley T is normally in engagement with a live contact N. As soon as the vessel has rolled more than a predetermined degree, the trolley T₁ leaves contact N and thus breaks the circuit through the relays L—L' and hence through the motor M to stop the actuation of the rudder. It will be understood that in this case also the circuit through the motor is controlled jointly by the trolley T in engagement with the contact C or C' and trolley T₁ in engagement with contact N.

The most violent weather yawing is usually caused by combined pitching and rolling. I may employ this device, therefore, also to respond to combined excessive pitching and rolling by mounting a frame E for movement about an athwartship axis and connecting said frame by means, such as a roller 40, connected to the gyro G' operating in groove 41 in frame E to permit rolling movements of the vessel but which will cause frame E to be held in a fixed vertical plane by the gyro G'. A trolley T'' is thus held in the fixed vertical plane while a contact N' pitches with the ship. The trolley T'' will upon excessive pitching of the ship move out of engagement with contact N' to break the circuit through relay L—L' to stop the motor and the actuation of the rudder as in the case of trolley T₁ and contact N. It will be understood that the circuit through motor M includes besides trolley T, contact C—C', trolley T₁ and contact N, also the trolley T'', contact N'. If both trolleys T₁ or T'' move out of engagement with their respective contacts, the motor will be stopped. Here, too, as in the case of the Fig. 2 modification, instead of causing the circuit to be broken, a resistance in the field circuit may be short-circuited merely to slow down the motor. The same, of course, may be said also of the Fig. 1 form of the invention.

In all of the above forms of the invention, it will be apparent that the operation of cutting down the operation of the rudder during weather yaw is materially aided by the fact that there is a lag in the follow-up from the rudder. This is the case because the motor operating the rudder and the follow-up normally operates at a speed sufficient to cause the contacts to follow the trolley closely for ordinary yaw but not for the extraordinarily rapid weather yaw. The lag in the follow-up may be due not only to the slow running of the rudder operating motor but also to the lost motion between the rudder and the contacts, as in the telemotor or initial rudder adjustment disclosed in my copending application which matured into Patent No. 1,695,615 on December 18, 1928.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combinations and relations described, some of these may be altered and others omitted without interfering with the more general results outlined and the invention extends to such use.

Having described my invention, what I claim and desire to secure by Letters Patent is:

1. In an automatic steering device, in combination, a steering engine, means normally operative to bring the said engine into normal operation as normal yawing occurs, and means responsive to extraordinary yawing for lessening the operation of said engine.

2. In an automatic steering device for dirigible craft, in combination, a steering engine, a plurality of means responsive to yaw of the craft, and means whereby said first-named means actuates said engine to return the craft to its course, said first-named means including means responsive to an extraordinary yaw for temporarily stopping the operation of said engine during said yaw.

3. In an automatic steering device for dirigible craft, in combination, a steering engine, a plurality of means responsive to yaw of the craft, means whereby said first-named means actuates said engine to return the craft to its course, and means whereby one of said first-named means renders said engine temporarily ineffective when said craft yaws beyond a predetermined degree.

4. In an automatic steering device for dirigible craft, in combination, a steering engine, a plurality of means responsive to yaw of the craft, means whereby said first-named means actuates said engine to return the craft to its course, and means whereby one of said first-named means cuts down the degree of operation of said engine when said craft yaws beyond a predetermined degree.

5. In an automatic steering device for dirigible craft, in combination, a steering engine, a two-part control means, means whereby one of said parts is actuated in response to the total weather yaw and the other of said parts to a fraction of the total weather yaw of said craft, means whereby said control means actuates said engine to return the craft to its course, and means whereby said engine is rendered ineffective by the reversal of said other part materially in advance of the reversal of said first part.

6. In an automatic steering device for dirigible craft, in combination, a steering engine, a two-part control means responsive to yaw of the craft, means whereby said control means actuates said engine to return the craft to its course, and means whereby one of said parts renders said engine temporarily ineffective during a greater than normal yaw.

7. In an automatic steering device for dirigible craft, in combination, a steering engine, a two-part control means responsive to yaw of the craft, means whereby said control means actuates said engine to return the craft to its course, and means whereby one of said parts temporarily cuts down the degree of operation of said engine after a predetermined degree of yaw.

8. In an automatic steering device for dirigible craft, in combination an electric steering engine, a plurality of means responsive to yaw of the craft, each of said means operating a circuit closer in the circuit of said engine, said circuit closers being open when the craft is on its course, and means whereby one of said means responds to total weather yaw and the other of said means to a fraction of the total weather yaw of said craft, whereby said second means will open the circuit of said engine before the craft has returned to its course.

9. In an automatic steering device, in combination, a steering engine, means normally operative to bring the said engine into normal operation as normal yawing occurs, and means responsive to extraordinary yawing for actuating said engine for only a fraction of the period of said yaw without disturbing the normal operation of the engine.

10. In an automatic steering device for dirigible craft, in combination, a steering engine, a plurality of means responsive to yaw of the craft, means whereby one of said first-named means tends to energize said engine throughout the period of weather yaw, means whereby the other of said first-named means tends to energize said engine for only a small fraction of the period of weather yaw, and means whereby said engine is energized jointly by said first-named means to return the craft to its course so that said engine is energized for only a small fraction of the period of weather yaw.

11. In an automatic steering device for dirigible craft having a rudder, in combination, a steering engine for actuating said rudder, means normally operative to bring the said engine into normal operation as normal yawing occurs, and means responsive to weather yaw for operating said engine to actuate said rudder through only a fraction of the distance it would be actuated by normal operation of said first-named means.

12. In an automatic steering device for dirigible craft having a rudder, in combination, a steering engine for actuating said rudder, a plurality of means responsive to yaw of the craft, and means whereby said first-named means normally operates said engine to cause said rudder to return the craft to its course, said first-named means including means responsive to weather yaw for causing said engine to actuate said rudder through only a fraction of the distance it would be actuated by normal operation of said first-named means.

In testimony whereof I have affixed my signature.

ELMER A. SPERRY, Jr.